US007010269B2

United States Patent
Meehan et al.

(10) Patent No.: US 7,010,269 B2
(45) Date of Patent: Mar. 7, 2006

(54) PRE-EQUALIZER STRUCTURE BASED ON PN511 SEQUENCE FOR TERRESTRIAL DTV RECEPTION

(75) Inventors: Joseph Patrick Meehan, New York City, NY (US); David Koo, Carmel, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 564 days.

(21) Appl. No.: 09/850,396

(22) Filed: May 7, 2001

(65) Prior Publication Data

US 2002/0164966 A1 Nov. 7, 2002

(51) Int. Cl.
*H04B 1/68* (2006.01)
*H04L 27/06* (2006.01)

(52) U.S. Cl. .................... 455/47; 455/204; 455/229; 375/340; 375/229

(58) Field of Classification Search ............... 455/47, 455/204, 226.1, 260, 102, 265, 226.2; 329/304; 375/355, 367, 364, 321, 343, 229, 340, 233, 375/232, 347, 23; 348/726, 725; 379/29.01
See application file for complete search history.

(56) References Cited

U.S. PATENT DOCUMENTS

| 4,669,092 | A | * | 5/1987 | Sari et al. ................... 375/355 |
| 5,263,033 | A | * | 11/1993 | Seshadri ..................... 375/233 |
| 5,661,778 | A | * | 8/1997 | Hall et al. ................ 379/29.01 |
| 6,456,654 | B1 | * | 9/2002 | Ginesi et al. ............... 375/229 |
| 6,570,918 | B1 | * | 5/2003 | Rademacher ............... 375/232 |
| 6,628,706 | B1 | * | 9/2003 | Lindoff ....................... 455/102 |
| 6,707,868 | B1 | * | 3/2004 | Camagna et al. ........... 375/229 |
| 2002/0037058 | A1 | * | 3/2002 | Birru .......................... 375/340 |
| 2002/0131488 | A1 | * | 9/2002 | Allpress et al. ............. 375/233 |
| 2002/0131536 | A1 | * | 9/2002 | Veillette ..................... 375/347 |
| 2002/0181576 | A1 | * | 12/2002 | Kennedy et al. ............ 375/233 |
| 2003/0095592 | A1 | * | 5/2003 | Bergmans et al. .......... 375/347 |
| 2005/0111540 | A1 | * | 5/2005 | Modrie et al. .............. 375/232 |

* cited by examiner

*Primary Examiner*—Lana Le

(57) ABSTRACT

A free-running sample rate converter and a large spanning, non-linear pre-equalizer are employed before a timing recovery loop within a wireless receiver chain, while forward and feedback equalization after the timing recovery loop (at and around the input of a sync detector) is also retained. A channel identifier produces a channel estimate from the PN511 training sequence within the received wireless signals, with the pre-equalizer employing the resulting channel estimate to equalize the received signals being passed to the timing recovery loop, improving the signal quality for carrier and timing recovery and decoding to increase the probability of successful decoding while enabling the use of fast tracking forward and feedback equalizers for decoding.

17 Claims, 3 Drawing Sheets

PRE-EQUALIZER STRUCTURE BASED ON PN511 SEQUENCE FOR TERRESTRIAL DTV RECEPTION

TECHNICAL FIELD OF THE INVENTION

The present invention is directed, in general, to signal processing for wireless receivers and, more specifically, to channel equalization within wireless receivers.

BACKGROUND OF THE INVENTION

Current Advanced Television Systems Committee (ATSC) digital television (DTV) terrestrial receivers may fail due to the lack of clock recovery as a result of imperfections in the channel. Moreover, occasionally an equalizer within such a receiver will not adapt to an optimum setting, causing poor performance.

A typical ATSC wireless receiver implementation, illustrated in FIG. 4, places a small, semi-complex forward equalizer (FE) 400 in front of a sync detector (SD) 401, after the timing recovery loop 402, to improve synchronization lock. However, equalizer 400 only performs equalization close in to the main signal due to the size limitations of the equalizer, and does not facilitate carrier recovery or timing recovery.

There is, therefore, a need in the art for improved channel equalization within terrestrial digital television receivers.

SUMMARY OF THE INVENTION

To address the above-discussed deficiencies of the prior art, it is a primary object of the present invention to provide, for use in a wireless receiver, a free-running sample rate converter and a large spanning, non-linear pre-equalizer which are employed before a timing recovery loop within a wireless receiver chain, while retaining equalization after the timing recovery loop (at the input of a sync detector). A channel identifier produces a channel estimate from the PN511 training sequence within the received wireless signals, with the pre-equalizer employing the resulting channel estimate to equalize the received signals being passed to the timing recovery loop, improving the signal quality for carrier and timing recovery and decoding to increase the probability of successful decoding while enabling the use of fast tracking forward and feedback equalizers for decoding.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
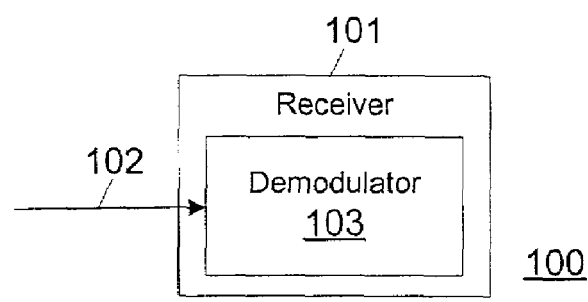
FIG. 1 depicts a receiver system including a pre-equalizer for improved channel equalization according to one embodiment of the present invention.
Figure 4:
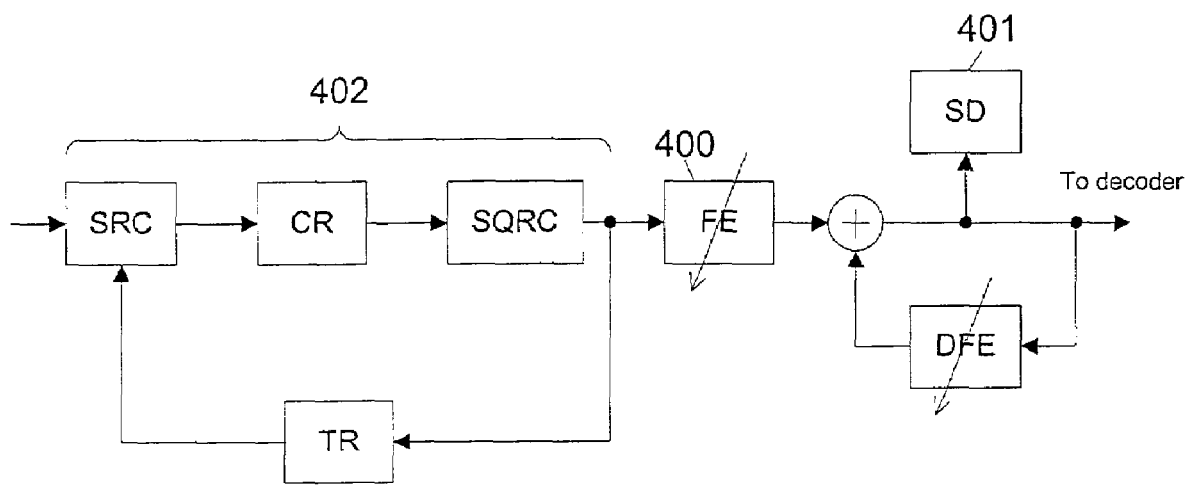
FIG. 4 is a block diagram of a typical ATSC wireless receiver.
Figure 2:
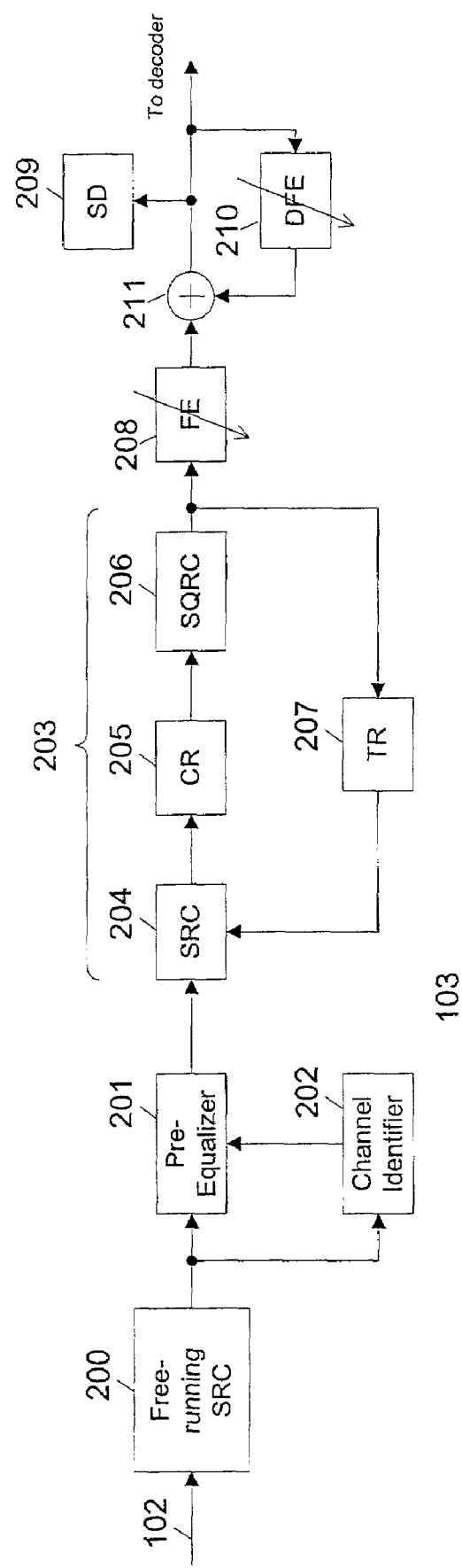
FIG. 2 illustrates in greater detail a demodulator including a pre-equalizer for improved channel equalization according to one embodiment of the present invention.
Figure 3:
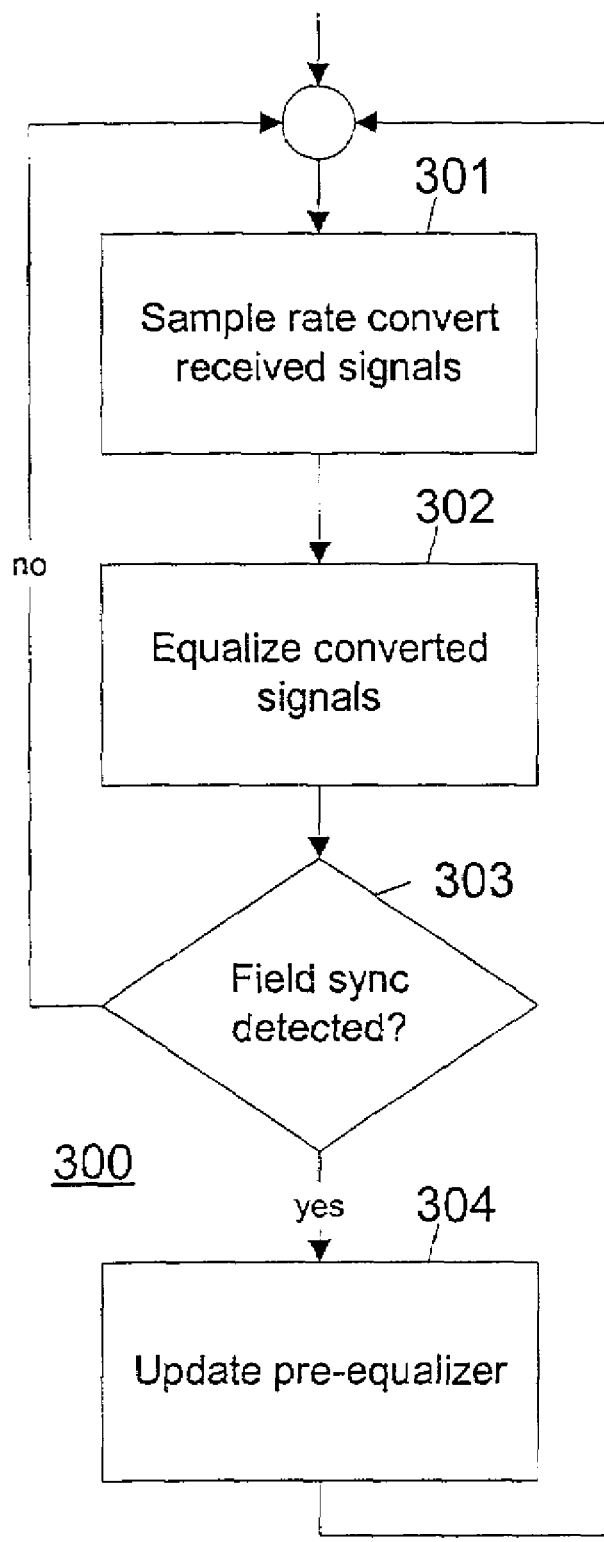
FIG. 3 is a high level flow chart for a process of pre-equalization according to one embodiment of the present invention.

FIGS. 1 through 3, discussed below, and the various embodiment used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a receiver system including a pre-equalizer for improved channel equalization according to one embodiment of the present invention. Receiver system 100 includes a receiver 101, which is a digital television (DTV) receiver in the exemplary embodiment, including an input 102 for receiving wireless signals and a demodulator 103 including a pre-equalizer as described in greater detail below.

The present invention may also be employed for any receiver such as, for example, a broadband wireless Internet access receiver. Regardless of the embodiment, however, receiver 101 includes a demodulator 103 employing a pre-equalizer for improved channel equalization in accordance with the present invention, as described in further detail below.

Those skilled in the art will perceive that FIG. 1 does not explicitly depict every component within a receiver system. Only those portions of such a system that are unique to the present invention and/or required for an understanding of the structure and operation of the present invention are shown.

FIG. 2 illustrates in greater detail a demodulator including a pre-equalizer for improved channel equalization according to one embodiment of the present invention. Demodulator 103 includes a free-running sample rate converter (SRC) 200 coupled to the receiver input 102. The output of sample rate converter 200 is passed to both pre-equalizer 201 and channel identifier 202, which perform channel equalization as described in further detail below.

The output of pre-equalizer 201 is then passed to an essentially conventional receiver chain front end, including a timing recovery loop 203 formed by sample rate converter 204, carrier recovery (CR) unit 205, square root raised cosine (SQRC) filter 206, and timing recovery (TR) feedback unit 207, as well as a forward equalizer (FE) 208 and sync detector (SD) 209 coupling the timing recovery loop 203 to a decoder (not shown) and a decision feedback equalizer (DFE) 210 coupled between the connection to the decoder and a summer 211 between the forward equalizer 208 and the sync detector 209. The forward equalizer 208 conventionally situated between the timing recovery loop 203 and sync detector 208 and the decision feedback equalizer 210 providing feedback at the input to sync detector 209 are retained, and perform the rapid dynamic tracking. Those equalizers are augmented, however, by pre-equalizer 201, which performs a rough equalization.

Pre-equalizer 201 is a large spanning, non-linear passband equalizer placed in front of timing recovery, carrier recovery, and sync detection units of a conventional front-end receiver chain to improve performance of the front end system. The sample rate converted input signal is fed to channel identifier 202 which, based on a correlation to the ATSC terrestrial digital television standard PN511 training sequence as specified in ATSC Document A/53 currently available from http://www.atsc.org/Standards/A53/, generates a set of equalizer coefficients from a channel estimate based on the PN511 sequence and passes those coefficients to pre-equalizer 201.

The generated coefficients are not likely to be ideal due to the inadequacies of the PN511 sequence in characterizing a channel. However, the pre-equalizer 201 is preferably a small, sub-optimum non-linear equalizer capable of cleaning up the signal such that the timing recovery loop 203 should be able to function without any difficulties.

Pre-equalizer 201 will preferably not be updated very frequently, perhaps with the occurrence of each field sync signal within the received data stream, or even less often, and would therefore be static or very slowly varying based on the channel identifier 202. However, a cleaner signal will be provided to the carrier recovery, timing recovery, and main equalization units, improving the chances of successful decoding and allowing the forward equalizer 208 and decision feedback equalizer 210 to be a fast tracking equalizer. The length of pre-equalizer 201 depends on implementation constraints, but pre-equalizer 201 should operate at passband.

FIG. 3 is a high level flow chart for a process of pre-equalization according to one embodiment of the present invention. The process 300 is implemented within demodulator 103 depicted in FIGS. 1 and 2. Only a portion of the process is illustrated, and begins with the assumption that the pre-equalizer has been initialized with coefficients based a channel estimate derived from the training sequence.

The portion of the process depicted begins with free-running sample rate conversion, without timing error feedback information, of the received wireless signals (step 301). The process then passes to equalization of the sample converted signals utilizing the current coefficients derived from the training sequence-based channel estimate (step 302). A determination is then made of whether a field sync signal has been received (step 303). If not, the process returns to sample rate conversion and equalization using current coefficients (steps 301 and 302). If so, however, the process proceeds instead to updating the coefficients employed by the pre-equalizer (step 304). The process continues until externally interrupted.

The present invention improves the signal quality for carrier and timing recovery and decoding, increasing the probability of successful decoding. Use of fast tracking forward and feedback equalizers for decoding is also facilitated.

Although the present invention has been described in detail, those skilled in the art will understand that various changes, substitutions and alterations herein may be made without departing from the spirit and scope of the invention it its broadest form.

What is claimed is:

1. A demodulator for facilitating carrier and timing recovery and decoding within a receiver comprising:
    a free-running sample rate converter coupled to an input for receiving a wireless signal stream;
    a channel identifier receiving an output of said sample rate converter and producing a channel estimate based on a training sequence within said received wireless signal stream; and
    a pre-equalizer receiving said output of said sample rate converter and said channel estimate and equalizing said output of said sample rate converter utilizing said channel estimate, said pre-equalizer passing said equalized output of said free running sample rate converter to a timing recovery loop.

2. The demodulator as set forth in claim 1 wherein said training sequence employed by said channel identifier to produce said channel estimate is a PN511 training sequence.

3. The demodulator as set forth in claim 1 wherein said channel identifier provides equalization coefficients based upon said channel estimate to said pre-equalizer.

4. The demodulator as set forth in claim 1 wherein said channel identifier updates said equalization coefficients employed by said pre-equalizer in intervals at least as great as intervals between occurrences of a field synchronization signal within the received signal stream.

5. The demodulator as set forth in claim 1 wherein said demodulator includes an equalizer between said timing recovery loop within said demodulator and a sync detector unit within said demodulator.

6. The demodulator as set forth in claim 1 wherein said pre-equalizer is a large spanning non-linear equalizer.

7. A receiver comprising:
    an antenna input; and
    a demodulator for facilitating carrier and timing recovery and decoding comprising:
        a free-running sample rate converter coupled to said antenna input and receiving a wireless signal stream;
        a channel identifier receiving an output of said free running sample rate converter and producing a channel estimate based on a training sequence within said received wireless signal stream; and
        a pre-equalizer receiving said output of said free running sand sample rate converter and said channel estimate and equalizing said output of said sample rate converter utilizing said channel estimate, said pre-equalizer passing said equalized output of said free running sample rate converter to a timing recovery loop.

8. The receiver as set forth in claim 7 wherein said training sequence employed by said channel identifier to produce said channel estimate is a PN511 training sequence.

9. The receiver as set forth in claim 7 wherein said channel identifier provides equalization coefficients based upon said channel estimate to said pre-equalizer.

10. The receiver as set forth in claim 7 wherein said channel identifier updates said equalization coefficients employed by said pre-equalizer in intervals at least as great as intervals between occurrences of a field synchronization signal within the received signal stream.

11. The receiver as set forth in claim 7 wherein said demodulator includes an equalizer between said timing recovery loop within said demodulator and a sync detector unit within said demodulator.

12. The receiver as set forth in claim 7 wherein said pre-equalizer is a large spanning non-linear equalizer.

13. A method of demodulation facilitating carrier and timing recovery and decoding within a receiver comprising:
  sample rate converting a received wireless signal stream using a free-running sample rate converter;
  producing a channel estimate for the received wireless signal stream based on a training sequence within the sample rate converted wireless signal stream; and
  equalizing the sample rate converted wireless signal stream utilizing the channel estimate and passing the equalized wireless signal stream to the timing recovery loop.

14. The method as set forth in claim 13 wherein the step of producing a channel estimate for the received wireless signal stream based on a training sequence within the sample rate converted wireless signal stream further comprises:
  employing a PN511 training sequence within the sample rate converted wireless signal stream to produce the channel estimate.

15. The method as set forth in claim 13 wherein the step of producing a channel estimate for the received wireless signal stream based on a training sequence within the sample rate converted wireless signal stream further compromises:
  providing equalization coefficients based upon the channel estimate to a pre-equalizer equalizing the sample rate converted wireless signal stream.

16. The method as set forth in claim 15 wherein the step of producing a channel estimate for the received wireless signal stream based on a training sequence within the sample rate converted wireless signal stream further compromises:
  updating the equalization coefficients employed by the pre-equalizer in intervals at least as great as intervals between occurrences of a field synchronization signal within the received signal stream.

17. The method as set forth in claim 13 further compromising:
  equalizing an output of the timing recovery loop prior to employing a sync detector unit on the output of the timing recovery loop.

* * * * *